United States Patent
Cohen

(10) Patent No.: US 8,279,227 B2
(45) Date of Patent: Oct. 2, 2012

(54) METHOD FOR DETECTING COLLISIONS AMONG LARGE NUMBERS OF PARTICLES

(75) Inventor: Jonathan Cohen, Ann Arbor, MI (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 767 days.

(21) Appl. No.: 12/111,075

(22) Filed: Apr. 28, 2008

(65) Prior Publication Data

US 2009/0251469 A1    Oct. 8, 2009

Related U.S. Application Data

(60) Provisional application No. 61/042,411, filed on Apr. 4, 2008, provisional application No. 61/042,404, filed on Apr. 4, 2008.

(51) Int. Cl.
*G06T 13/00* (2006.01)
(52) U.S. Cl. ........................................................ 345/473
(58) Field of Classification Search .................. 345/473
See application file for complete search history.

(56) References Cited

U.S. PATENT DOCUMENTS

| | | | |
|---|---|---|---|
| 5,515,489 A | 5/1996 | Yaeger | |
| 5,594,671 A | 1/1997 | Chen et al. | |
| 6,049,341 A | 4/2000 | Mitchell | |
| 6,067,096 A | 5/2000 | Nagle | |
| 6,208,357 B1 | 3/2001 | Koga et al. | |
| 6,708,142 B1 | 3/2004 | Baillot et al. | |
| 7,403,202 B1 | 7/2008 | Nash | |
| 7,796,128 B2 * | 9/2010 | Radzikowski et al. | 345/419 |
| 2002/0161562 A1 | 10/2002 | Strunk et al. | |
| 2003/0227455 A1 * | 12/2003 | Lake et al. | 345/421 |
| 2005/0162433 A1 | 7/2005 | Tonge et al. | |
| 2005/0165874 A1 | 7/2005 | Zhang et al. | |
| 2005/0248570 A1 | 11/2005 | Stelly | |
| 2006/0149516 A1 | 7/2006 | Bond et al. | |
| 2006/0217945 A1 | 9/2006 | Leprevost | |
| 2006/0235659 A1 | 10/2006 | Stam | |
| 2007/0035547 A1 | 2/2007 | Anderson et al. | |

(Continued)

OTHER PUBLICATIONS

U.S. Appl. No. 61/042,411, filed Apr. 4, 2008; Inventors Cohen et al.; entitled "Method for Simulating Large Numbers of Spherical Bodies Interacting"; all pages [92001].

(Continued)

*Primary Examiner* — Ryan R Yang
(74) *Attorney, Agent, or Firm* — Fitch, Even, Tabin & Flannery, LLP

(57) ABSTRACT

A method for detecting object collisions in a simulation, which includes identifying a plurality of objects moving along a path within a simulation area, and defining a grid comprising defined regions which individually define a region within which any of the plurality of objects could potentially occupy. For each of the objects, the method further includes identifying which of the defined regions that each of the plurality of object occupies for at least a portion of a time step, and for each of the objects, determining an associated potential collision set by identifying objects of the plurality of objects which occupy common regions of the defined regions during any portion of the time step. In addition, for each of the objects, the method further includes determining an actual collision set comprising objects with which a given object will collide during the time step based upon location parameters of objects included in the potential collision set.

20 Claims, 4 Drawing Sheets

U.S. PATENT DOCUMENTS

| | | | |
|---|---|---|---|
| 2007/0083290 | A1 | 4/2007 | Nagasaka |
| 2007/0239409 | A1 | 10/2007 | Alan |
| 2008/0192046 | A1* | 8/2008 | Fowler et al. ............... 345/419 |
| 2008/0192047 | A1* | 8/2008 | Radzikowski et al. ....... 345/419 |
| 2008/0232602 | A1* | 9/2008 | Shearer ............................ 381/17 |
| 2008/0243452 | A1 | 10/2008 | Bowers et al. |
| 2008/0270092 | A1 | 10/2008 | Cohen et al. |
| 2009/0306946 | A1 | 12/2009 | Badler et al. |

OTHER PUBLICATIONS

U.S. Appl. No. 61/042,404, filed Apr. 4, 2008; Inventor Jonathan Cohen; entitled "Method for Detecting Collisions Among Large Number of Particles"; all pages [92002].

U.S. Appl. No. 60/926,594, filed Apr. 27, 2007; Inventors Cohen et al; entitled "Continuous-Time Particle Simulation of Sand"; all pages.

U.S. Appl. No. 60/926,506, filed Apr. 27, 2007; Inventors Bloom et al; entitled "FX for the Birth of Sandman Sequence"; all pages.

U.S. Appl. No. 60/926,501, filed Apr. 27, 2007; Inventor Jonathan Cohen; entitled "Dynamic Execution Tracing of Physical Simulations"; all pages.

U.S. Appl. No. 60/926,494, filed Apr. 27, 2007; Inventors Pilgrim et al; entitled "How to Build a Sixty Foot Man of Moving Sand"; all pages.

U.S. Appl. No. 60/926,497, filed Apr. 27, 2007; Inventors Laney et al; entitled "Geometry Bombing. A Technique Place Procedural Geometry Instances Using Proxy"; all pages.

U.S. Appl. No. 12/111,069, filed Apr. 28, 2008; Inventors Cohen et al.; entitled "Method for Simulating Large Number of Spherical Bodies Interacting"; all pages [92089].

Bell, N. et al.; "Particle-Based Simulation of Granular Materials"; Eurographics/ACM SIGGRAPH Symposium on Computer Animation; The Eurographics Association; 2005; 10 pages.

Moore, M. et al.; "Collision Detection and Response for Computer Animation"; Computer Graphics, SIGGRAPH, vol. 22, No. 4; Aug. 1988; pp. 289-298.

Guendelman, E. et al.; "Nonconvex Rigid Bodies with Stacking"; ACM Transactions on Graphics, SIGGRAPH; vol. 22, No. 3; Jul. 2003; 8 pages.

USPTO; Office Action issued in U.S. Appl. No. 12/111,069; mailed May 5, 2011; 17 pages.

USPTO; Final Office Action issued in U.S. Appl. No. 12/111,069; mailed Oct. 4, 2011; 17 pages.

Popovic et al.; "Interactive Manipulation of Rigid Body Simulation;" ACM; SIGGRAPH '00; 2000; 11 pgs.

Pelechano et al.; "Real-Time Collision Detection Between Cloth and Skinned Avatars Using OBB;" University College London; Sep. 9, 2002; 62 pgs.

Egan et al.; "Techniques for Real-Time Rigid Body Simulation;" Brown University; May 2003; 44 pgs.

Redon et al.; "Adaptive Dynamics of Articulated Bodies;" ACM; SIGGRAPH '05; vol. 24, Issue 3; Jul. 2005; 11 pgs.

Lee et al.; "Impulse-Based Dynamic Simulation of Articulated Rigid Bodies with Aerodynamics;" 2006 IEEE International Conference on System, Man, and Cybernetics; Oct. 2006; pp. 4420-4427.

USPTO, Interview Summary issued in U.S. Appl. No. 12/111,069 mailed Dec. 29, 2011; 3 pages.

USPTO, Notice of Allowance issued in U.S. Appl. No. 12/111,069 mailed Mar. 8, 2012 (includes Examiner-Initiated Interview Summary), 12 pages.

\* cited by examiner

METHOD FOR DETECTING COLLISIONS AMONG LARGE NUMBERS OF PARTICLES

CROSS-REFERENCE TO RELATED APPLICATIONS

This application claims the benefit of U.S. Provisional Application No. 61/042,404, filed Apr. 4, 2008, and U.S. Provisional Application No. 61/042,411, filed Apr. 4, 2008, both of which are hereby incorporated herein by reference in their entireties.

U.S. patent application Ser. No. 12/111,069, filed on the same date as this application, entitled "METHOD FOR SIMULATING LARGE NUMBERS OF SPHERICAL BODIES INTERACTING," by inventors Jonathan Cohen et al., which is hereby fully incorporated herein by reference in its entirety.

BACKGROUND OF THE INVENTION

1. Field of the Invention

The present invention relates generally to computer graphics and animation, and more specifically to detecting collisions among large numbers of particles/objects/bodies interacting.

2. Discussion of the Related Art

Computer animation is increasingly being used in movies, motion pictures, television, video games, etc. It is often necessary in such animations to simulate the dynamics of large numbers of bodies interacting, such as rocks, sand, etc., and to detect collisions among such objects.

SUMMARY OF THE INVENTION

One embodiment provides a method for detecting object collisions in a simulation. The method includes identifying a plurality of objects within a defined area, and defining a plurality of grids, each comprising defined regions, some of which individually include at least one of the plurality of objects within an associated one of the defined regions. The method further includes building a data tree in which each leaf node is implemented with one of the plurality of grids, and identifying collisions between objects of the plurality of objects by searching the data tree.

Another embodiment provides a method for detecting object collisions in a simulation, which includes identifying a plurality of objects moving along a path within a simulation area, and defining a grid comprising defined regions which individually define a region within which any of the plurality of objects could potentially occupy. For each of the objects, the method further includes identifying which of the defined regions that each of the plurality of object occupies for at least a portion of a time step, and for each of the objects, determining an associated potential collision set by identifying objects of the plurality of objects which occupy common regions of the defined regions during any portion of the time step. In addition, for each of the objects, the method further includes determining an actual collision set comprising objects with which a given object will collide during the time step based upon location parameters of objects included in the potential collision set.

In yet another embodiment, a computer-readable medium for detecting object collisions in a simulation includes instructions which, when executed by a processor, cause the processor to perform operations such as identifying a plurality of objects moving along a path within a simulation area, and defining a grid comprising defined regions which individually define a region within which any of the plurality of objects could potentially occupy. For each of the objects, operations further include identifying which of the defined regions that each of the plurality of object occupies for at least a portion of a time step, and for each of the objects, determining an associated potential collision set by identifying objects of the plurality of objects which occupy common regions of the defined regions during any portion of the time step. In addition, for each of the objects, another operation includes determining an actual collision set comprising objects with which a given object will collide during the time step based upon location parameters of objects included in the potential collision set.

A better understanding of the features and advantages of various embodiments of the present invention will be obtained by reference to the following detailed description and accompanying drawings which set forth an illustrative embodiment in which principles of embodiments of the invention are utilized.

BRIEF DESCRIPTION OF THE DRAWINGS

The above and other aspects, features and advantages of embodiments of the present invention will be more apparent from the following more particular description thereof, presented in conjunction with the following drawings.

DETAILED DESCRIPTION

Some of the embodiments of the present invention provide a method for detecting collisions among a large number of particles/objects/bodies. In some embodiments, the particles are assumed to be spheres for purposes of analysis, which provides a system that is purely sphere-based. This provides a useful general purpose set of functionality that is applicable to physical simulation algorithms that use spheres only. For example, in some embodiments the method may be used with a sand simulator, which is sphere based.

In some embodiments, the method may be implemented with a data structure for detecting sphere-sphere collisions for spheres moving along linear trajectories. In general, the data structure may comprise a spatial data structure. The data structure and a set of algorithms that operate on that data structure may be used to efficiently detect when spheres moving along linear trajectories will collide. Given a large set of spheres (on the order of 100 k) moving with a constant velocity, this data structure may be used to efficiently: identify whether any spheres are currently colliding; identify when the next collision will occur; within a given time window, identify which pairs of spheres will collide; for a given sphere, identify all of the other spheres with which it will collide over some time period. These are useful operations for simulation applications. The data structure is robust even when the spheres are widely spread out, with large numbers of outliers, as can happen in a complex physical system. In some embodiments, it also allows for efficient updating of the position and velocities of individual spheres, only rebuilding the data structure near the spheres that have been updated.

Various embodiments relate to a data structure for detecting sphere-sphere collisions for spheres moving along linear, for example, trajectories. One aspect includes forming a k-d tree of uniform grids. Another feature relates to the use of uniform grids with outlier detection. This feature includes building a histogram in each direction, finding N outliers based on the histogram, and ignoring such outliers when building the uniform grid in order to keep the grid from growing too large. The outliers, which are typically relatively small in numbers, may be left in a linear or flat list.

This data structure may be hierarchically built using a divide-and-conquer algorithm based on a heuristic that determines at each level whether to split further or stop with a uniform grid. An algorithm may be used for traversing the data structure to find all possible pairs of collisions within a given time span.

Figure 1:
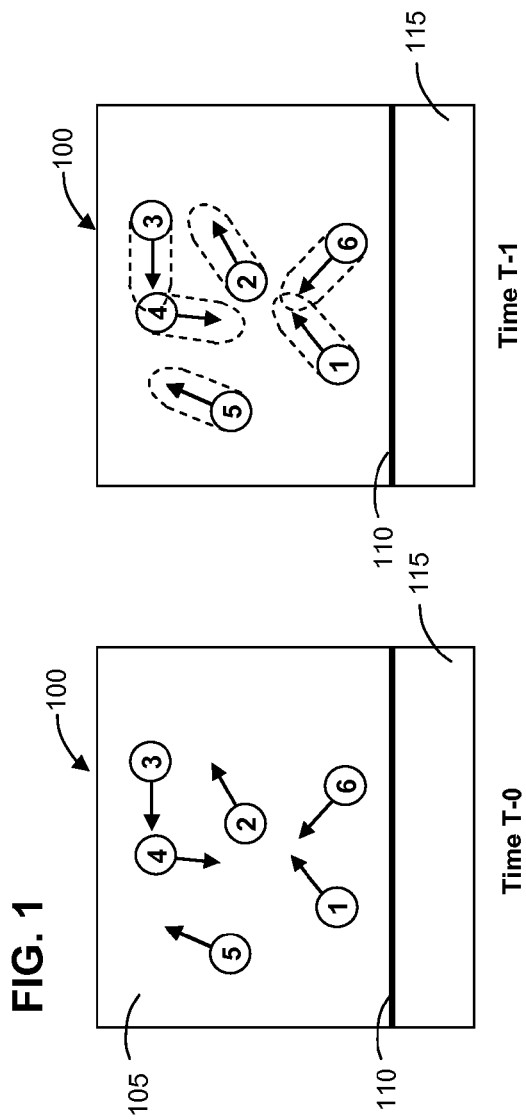
FIG. 1 depicts a simulation for spherical bodies or other objects moving within an environment.

Turning now to the figures, FIG. 1 depicts a simulation for spherical bodies or other objects moving within an environment or simulation area. In particular, simulation 100 at time T-0 includes a number of objects (e.g., spherical bodies, particles, etc.), which are denoted by reference numbers 1-6. The objects are shown moving along respective paths within environment 105, which is bounded by surface 110 of ground 115.

Each object 1-6 includes an arrow which denotes an associated parameter (e.g., velocity, direction, trajectory, combinations thereof). For clarity, further description will relate primarily to the arrow of the object as defining a trajectory or direction, but such teachings apply equally to other parameters. In addition, only a few objects are shown, but the various simulation techniques presented herein apply also to scenarios in which greater numbers (e.g., ranging from dozens to several hundred thousands, or more) of objects are present.

Typically, environment 105 includes a gravitational parameter which is a force applied to objects 1-6. In some embodiments, gravity will ultimately cause the objects to fall toward surface 110. In addition, since each of the objects is moving about in various directions, collisions among these objects is inevitable, absent an intervening operation.

Time T-1 depicts an example of possible collisions which may occur during this time period. In particular, each of the objects 1-6 is shown drawn using an extruded sphere in dashed lines to signify an intended path that each respective object will travel over the time period between time T-0 and time T-1, which is one example of a time step.

Notably, the intended paths of several objects as shown overlapping. In a first example, objects 3 and 4 are shown overlapping. This overlapping does not result in a collision since the terminal portion of the path of object 3 is in the area proximate to the beginning portion of the path of object 4. In other words, object 3 ends up at the location that object 4 originates (during the given time step). Since object 4 moves from this original location, it therefore avoids a collision with object 3. In a second example, the terminal end of the intended paths of objects 1 and 6 overlap, thus indicating that a collision will occur.

During a simulation, common queries relate to the identification of which objects within an environment will collide within a given time period. The example of time T-1 will return the identification that object 1 will collide with object 6 within the time period ranging from time T-0 to time T-1. Various techniques for identifying such collisions will now be described.

Figure 2:
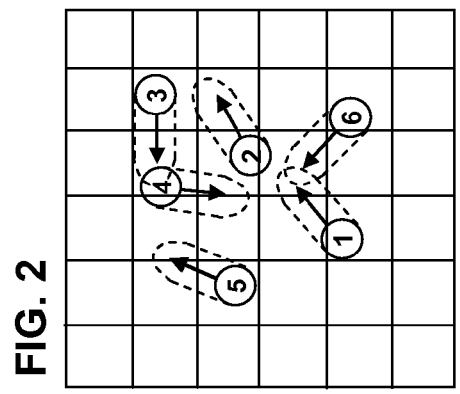
FIG. 2 depicts a uniform grid within which an object is located.

FIG. 2 depicts a uniform grid within which objects 1-6 as shown occupying or otherwise being located. In general, a uniform grid is a spatial partitioning scheme having defined regions. A grid is uniformly subdivided and superimposed onto a particular scene or environment. Each box of the grid may be implemented as a voxel. A voxel-based object model representation may be used to implement the grid of FIG. 2. In particular, objects may be represented as two-dimensional arrays of regularly or irregularly sampled volume elements rather than as lists of polygons, or primitive surfaces, or geometries. These volume elements, also called voxels, typically contain information relating to an associated object (e.g., position, velocity, radius of travel, and the like).

In the example of FIG. 2, the objects 1-6 are shown drawn using an extruded sphere in dashed lines which signifies an intended path of each respective object during a given time period or time step. During this time period, for example, the objects therefore will occupy or otherwise pass through one or more boxes or voxels, such as that which is depicted in the figure.

Consider the example in which potential collisions for a particular object, such as object 1, is to be determined. One technique includes determining if object 1 will collide with each of objects present in the simulation. This technique is relatively time consuming since this collision test must be performed for objects 2-6. This technique becomes increasingly more burdensome as the number of objects in the simulation rises.

Another technique, according to various embodiments, does not look to each object in the simulation in order to determine an actual collision set for a particular object. Instead, this technique identifies, for each of the objects, which of the defined regions (e.g., boxes of a grid) that each object occupies for at least a portion of a time step. Another operation, for each of the objects, includes determining an associated potential collision set by identifying objects of the plurality of objects which occupy common regions of the defined regions during any portion of the time step. A further operation includes, for each of the objects, determining an actual collision set having objects with which a given object will collide during the time step based upon location parameters of objects included in the potential collision set. Examples of location parameters include a path along which an associated object travels during a time step, position of an object, and velocity of the object, among others.

Turning now to the specific example of FIG. 2, collision detection may therefore be achieved by examining objects which are located in or pass through a box which is the same box that a given object is present or passes through during the same time step. More specifically, consider the example in which a potential collision set is calculated for object 1, which is shown passing through four boxes for a given time step. Note also that object 6 passes through four boxes, one of which overlaps with a box of object 1. Since these objects have a common region or box, then these objects are examined in more detail to see if they will collide during the given time step. In the depicted scenario, objects 1 and 6 will collide as they near the terminal end of the time step. Note that this technique allows for the calculation of the collision set for object 1 by examining location parameters, for example, of only object 6, which is quicker than considering all of the objects present in the simulation.

Figure 3:
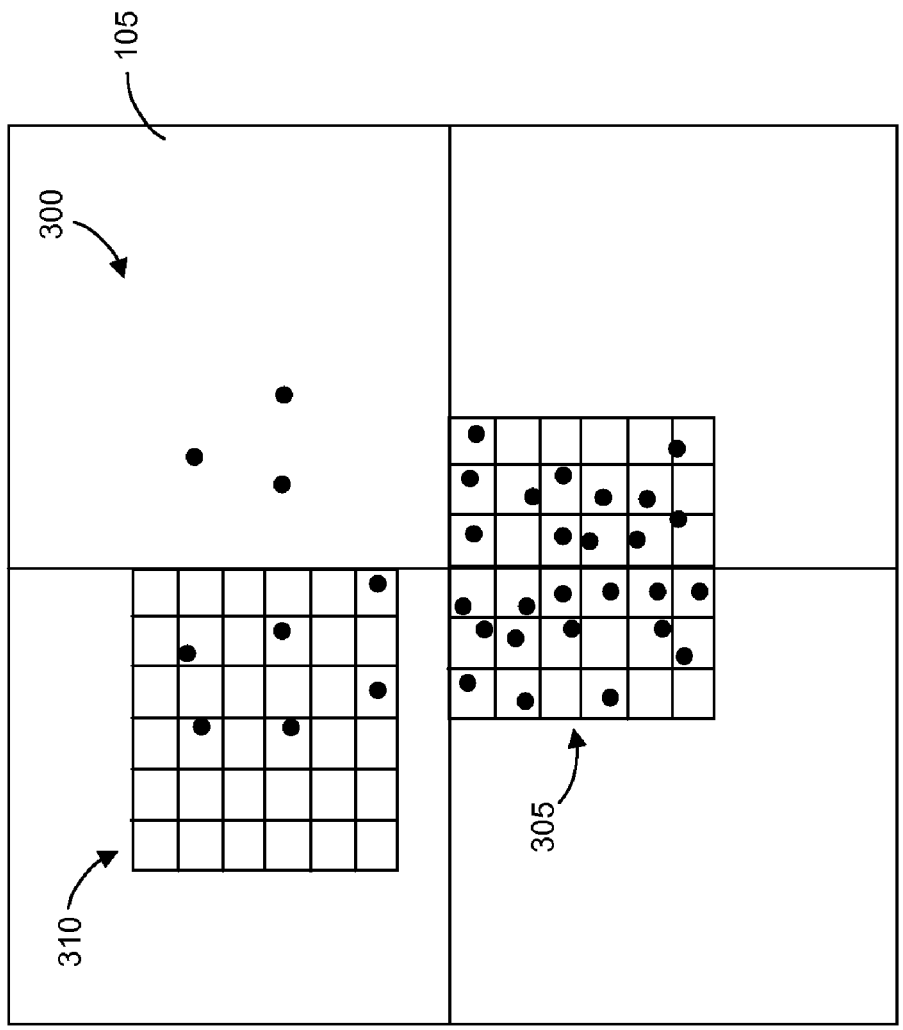
FIG. 3 depicts a simulation during which a number of objects are moving within an environment.
Figure 3:
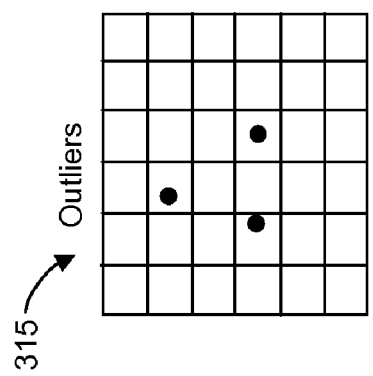

FIG. 3 depicts a simulation during which a number of objects are moving within an environment. In particular, a number of objects 300 are shown located within environment 105. A data structure may be created by recursively dividing the space of the environment into pairs of subspaces. This process will typically be performed until a grid is formed which contains at most one object per box and the objects within the box meet a threshold density of objects. Grid 305 is an example of such a grid containing objects that meet this threshold density. Grid 310 may be generated in a similar manner.

FIG. 3 also depicts grid 315, which is a grid containing outlier objects. An example of an outlier object is one which is numerically distant from other portions or groupings of objects. In FIG. 3, such objects are those which are not included in grids 305 and 310, and which are present in environment 105.

One reason for not storing the outliers in the same grid as the other objects is to reduce the number of objects in the grid. Minimizing the number of objects in the grid, which is achieved by placing the outliers in a separate grid, will therefore minimize the resources (e.g., memory) necessary for storing the objects. In particular, a smaller sized grid will typically requires fewer voxels, and thus, less memory. Consider the following example.

First, consider the scenario of a one dimensional list which includes objects and blank regions. In this example, an "x" represents an object and a "-" represents a blank region, such that:

x - - - x - - - - x - x - x - x - x.

Without using an outlier feature, each of the objects and blank regions may be stored in a single grid. This arrangement will utilize 18 voxels so that the complete set of objects and blank regions may be stored.

Using an outlier feature, the 2 leftmost objects are considered outliers. In this arrangement, only the right most objects and associated blank regions need to be stored.

In the above-identified example, only 9 voxels are stored in the grid, with the 2 left-most objects being stored in a list. The outlier feature therefore requires approximately half the amount of memory than the non-outlier example.

It is further noted that if the 2 outlier objects are stored in a list, since there are only 2 of these objects, then it does not cost significant processing resources while still providing savings by way of memory. In this example, a relatively minor increase in resources (e.g., less than 5 percent) may provide for relatively larger savings in terms of memory.

One specific example of illustrating the effectiveness of the outlier feature involves a pile of sand having a single grain that flies off far away. Rather than using a grid large enough for the sand pile plus the lonely single grain of sand, one can just store the single grain as an outlier. Thus, the arrangement would only need a voxel grid large enough for the sand pile plus a single outlier in a separate list.

Figure 4:
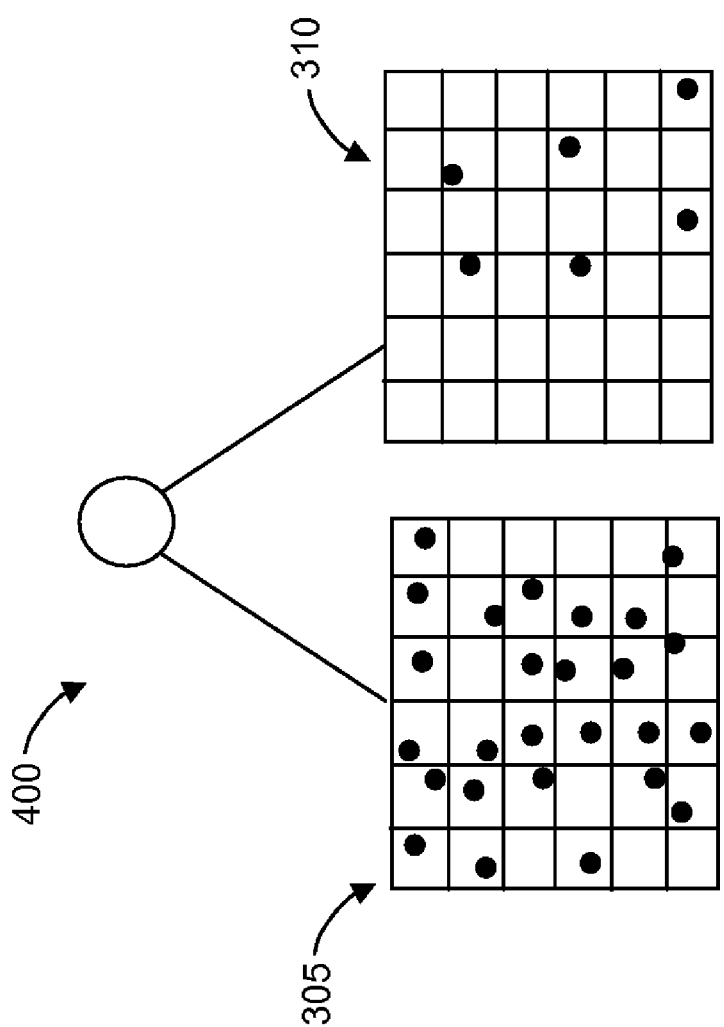
FIG. 4 depicts a data structure which may be used to search for object collisions.

FIG. 4 depicts a data structure which may be used to search for object collisions.

Data structure 400 is generally arranged as a k-d tree, such that each branch relates to a particular partition of a border box, such as the environment depicted in FIG. 3. In a typical k-d tree, each leaf node refers to a particular point. However, the data structure of FIG. 4 instead includes leaf nodes formed from uniform grids containing a distribution of objects. That is, each leaf node of data structure 400 contains multiple objects (contained within a grid), not simply the single object as used in a traditional k-d tree. In the example of FIG. 4, grid 305 is located at one leaf node of the data structure and grid 310 is located at another leaf node.

In operation, collision detection is achieved by searching data structure 400, which ultimately results in searching the various grids located at the leaf nodes of the data structure. For clarity, only two leaf nodes are shown in FIG. 4, but practical embodiments often include additional leaf nodes and corresponding grids. In some embodiments, the grid containing the object outliers are stored in a linear list which may be separately searched as part of the collision detection process. Such embodiments may be implemented to detect collisions between objects in applications such as video games, movies, virtual surgery, architectural modeling, and the like.

Figure 5:
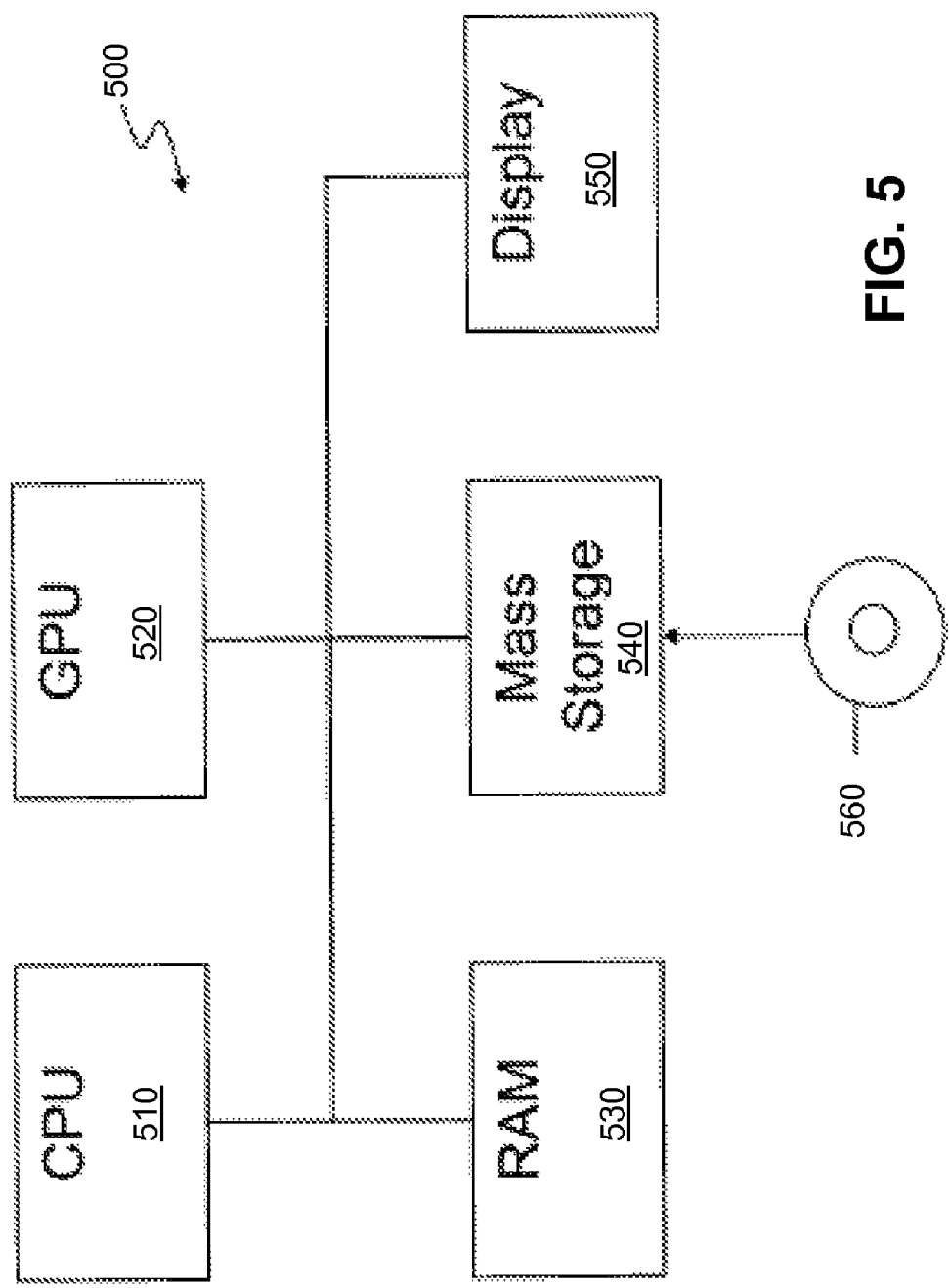
FIG. 5 is a block diagram depicting a system that may be used to implement various methods disclosed herein.

The methods and techniques described herein may be utilized, implemented and/or run on many different types of systems. Referring to FIG. 5 there is illustrated a system 500 that may be used for any such implementations. One or more components of system 500 may be used for implementing any system or device that, for example, implements the various collision detection techniques described above. However, the use of the system 500 or any portion thereof is certainly not required.

By way of example, system 500 may include, but is not required to include, a central processing unit (CPU) 510, a graphics processing unit (GPU) 520, a random access memory (RAM) 530, and a mass storage unit 540, such as a disk drive, and a display 550. The system 500 comprises an example of a processor based system.

The CPU 510 and/or GPU 520 may be used to execute or assist in executing the steps of the methods and techniques described herein, and various simulations may be rendered on display 550. Removable storage media 560 may optionally be used with the mass storage unit 540, which may be used for storing code that implements the methods and techniques described herein, such as code for performing the simulations as described above. However, any of the storage devices, such as the RAM 530 or mass storage unit 540, may be used for storing such code. For example, any of such storage devices may serve as a tangible computer storage medium for embodying a computer program for causing a computer, system, console, or other processor based system to execute or perform the steps of any of the methods, code, and/or techniques described herein. Furthermore, any of the storage devices, such as the RAM 530 or mass storage unit 540, may be used for storing any needed database(s).

In some embodiments, one or more of the methods and/or techniques described above may be implemented in a computer program executable by a processor based system. By way of example, a processor based system may comprise any type of system having one or more processors, such as the above-described system 500 or similar system, a computer, DVD player, Blu-ray disc player, entertainment system, game console, etc. Such computer program may be used for executing various steps and/or features of the above-described methods and/or techniques. In some embodiments, software modules within the computer program may be used for executing various steps and/or features of the above-described methods and/or techniques.

Such computer programs may be stored or embodied in any type of computer readable storage or recording medium. By way of example, such computer readable storage medium may include, but is not limited to, any type of computer memory or storage, such as main memory, local memory, ROM, RAM, mass storage, hard disk drive, network storage, USB storage, Blu-ray disc, digital video disk (DVD), compact disk (CD), floppy disk, etc.

The above description is not to be taken in a limiting sense, but is made merely for the purpose of describing the general principles of exemplary embodiments. The scope of the invention should be determined with reference to the claims.

What is claimed is:

1. A method for detecting object collisions in a simulation, the method comprising:
   identifying a plurality of objects within a defined area;
   defining a plurality of grids, each comprising a plurality of defined regions, some of which individually include at least one of the plurality of objects within an associated one of the defined regions;
   building a data tree in which each leaf node is implemented with one of the plurality of grids; and
   identifying collisions between objects of the plurality of objects by searching the data tree and by considering only those objects of the plurality of objects which occupy at least one common region of the plurality of defined regions during any portion of a time step.

2. The method according to claim 1, wherein multiple defined regions of the plurality of grids include a plurality of objects which occupy at least one common region of the plurality of defined regions during any portion of the time step.

3. The method according to claim 1, wherein the defined regions individually comprise boxes and wherein the at least one common region comprises at least one box shared by the defined regions of two or more objects during the time step.

4. The method according to claim 3, wherein identifying collisions comprises examining objects which are located in or pass through a box to determine whether a given object is present or passes through the same box during the same time step.

5. The method according to claim 1, wherein defining a plurality of grids comprises including only grids meeting a threshold density of objects and excluding outlier objects not within grids meeting the threshold density.

6. The method according to claim 5 further comprising storing each of outlier objects in a list and searching the list to identify collisions.

7. A method for detecting object collisions in a simulation, the method comprising:
   identifying a plurality of objects moving along a path within a simulation area;
   defining a grid comprising a plurality of defined regions which individually define a region within which any of the plurality of objects could potentially occupy;
   for each of the objects, identifying which of the plurality of defined regions that each of the plurality of objects occupies for at least a portion of a time step;
   for each of the objects, determining an associated potential collision set by identifying objects of the plurality of objects which occupy at least one common region of the defined regions during any portion of the time step; and
   for each of the objects, determining an actual collision set comprising objects with which a given object will collide during the time step based upon location parameters of objects included in the potential collision set.

8. The method according to claim 7, wherein the defined regions individually comprise boxes and wherein the at least one common region comprises at least one box shared by the defined regions of two or more objects during the time step.

9. The method according to claim 7, wherein the potential collision set comprises fewer objects than the number of the plurality of objects.

10. The method according to claim 9, wherein the actual collision set comprises fewer objects than the potential collision set.

11. The method according the claim 7, wherein the location parameters comprise a path along which an associated object travels during the time step.

12. The method according the claim 7, wherein the location parameters comprise position and velocity.

13. The method according to claim 7, wherein defining a plurality of grids comprises including only grids meeting a threshold density of objects and excluding outlier objects not within grids meeting the threshold density.

14. The method according to claim 13 further comprising storing each of the outlier objects in a list and searching the list to determine the associated potential collision set.

15. A computer-readable medium for detecting object collisions in a simulation, the computer-readable medium comprising instructions which, when executed by a processor, cause the processor to perform:
   identifying a plurality of objects moving along a path within a simulation area;
   defining a grid comprising a plurality of defined regions which individually define a region within which any of the plurality of objects could potentially occupy;
   for each of the objects, identifying which of the plurality of defined regions that each of the plurality of object occupies for at least a portion of a time step;
   for each of the objects, determining an associated potential collision set by identifying objects of the plurality of objects which occupy at least one common region of the defined regions during any portion of the time step; and
   for each of the objects, determining an actual collision set comprising objects with which a given object will collide during the time step based upon location parameters of objects included in the potential collision set.

16. The computer-readable medium according to claim 15, wherein the defined regions individually comprise boxes and wherein the at least one common region comprises at least one box shared by the defined regions of two or more objects during the time step.

17. The computer-readable medium according to claim 16, wherein the actual collision set comprises fewer objects than the potential collision set.

18. The computer-readable medium according to claim 15, wherein the potential collision set comprises fewer objects than the number of the plurality of objects.

19. The computer-readable medium according to claim 15, wherein the location parameters comprise a path along which an associated object travels during the time step.

20. The computer-readable medium according to claim 15, wherein the location parameters comprise position and velocity.

* * * * *